(12) United States Patent
Tsou et al.

(10) Patent No.: US 8,598,270 B2
(45) Date of Patent: Dec. 3, 2013

(54) MULTI-ARM STAR ETHYLENE POLYMERS AND PROCESS FOR MAKING

(75) Inventors: Andy H. Tsou, Allentown, PA (US); Shuji Luo, Bridgewater, NJ (US); Johannes M. Soulages, Morristown, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 12 days.

(21) Appl. No.: 13/182,953

(22) Filed: Jul. 14, 2011

(65) Prior Publication Data

US 2013/0018149 A1 Jan. 17, 2013

(51) Int. Cl.
*C08L 51/06* (2006.01)
*C08F 267/04* (2006.01)
*C08L 23/04* (2006.01)

(52) U.S. Cl.
USPC .............................. 525/70; 194/240

(58) Field of Classification Search
USPC ............................................ 525/70, 194, 240
See application file for complete search history.

(56) References Cited

U.S. PATENT DOCUMENTS

| 5,310,806 A | 5/1994 | Wild et al. |
| 5,936,058 A * | 8/1999 | Schauder ...................... 528/272 |
| 6,753,378 B2 | 6/2004 | Kojoh et al. |
| 2008/0199647 A1* | 8/2008 | Blackwell et al. ........... 428/41.8 |

FOREIGN PATENT DOCUMENTS

| EP | 0856541 | 8/1998 |
| EP | 0856542 | 8/1998 |
| EP | 0856544 | 8/1998 |

* cited by examiner

*Primary Examiner* — Jeffrey Mullis
(74) *Attorney, Agent, or Firm* — Robert A. Migliorini

(57) ABSTRACT

Provided is a multi-arm (greater than 3 arms) star ethylene polymer (sEP). The multi-arm star ethylene polymer is a polymer of an ethylene/maleic anhydride copolymer (EMAC) grafted with vinyl-terminated polyethylene. There are also provided a process for making the sEP and blend of a matrix ethylene polymer and the sEP.

23 Claims, 3 Drawing Sheets

MULTI-ARM STAR ETHYLENE POLYMERS AND PROCESS FOR MAKING

FIELD

The present disclosure relates to a multi-arm star ethylene polymer. The present disclosure further relates to a process for making a multi-arm star ethylene polymer. The present disclosure further relates to blends containing the multi-arm star ethylene polymer.

BACKGROUND

High molecular weight linear and branched polyolefins can be added to semi-crystalline polyolefins to increase their toughness and strength. The addition raises the inter-crystalline connectivity or the tie chain concentration of semi-crystalline polyolefins. High molecular weight linear polyolefin contributes to the creation of tie chains due to their inability to completely relax and organize their long backbones during the formation of chain-folded crystallites. Short-chain and long-chain branches in branched polyolefins also contribute to the formation of tie chains as the branches cannot be incorporated into growing crystallites. Typically, short-chain branches are introduced into high molecular weight polyolefins by using higher carbon number alpha olefin comonomers, such as butene, hexene, or octene, copolymerized with ethylene or propylene. Ultra high molecular weight and high molecular weight polyolefins are commonly linear.

In semi-crystalline polyolefins, the stack crystallites self-assemble into a meso structure of spherulites, cylindrilites, or fibrils. Long chain branches can provide connectivity between these meso structures. A preferred type of long-chain branching for enhancing toughness of a semi-crystalline polyolefin without compromising processability, stiffness, and tear balance is addition of a multi-arm star polymer. The long chain branches of a star polymer can provide connectivity between spherulites or other meso structures. A star typically has a lower impact on the polyolefin processability compared to other branch types such as comb and dendritic architectures. Being a relatively symmetric molecule, a star polymer can resist uni-directional orientation and thus minimize the preferential uniaxial stress-induced crystallization during processing. The uniaxial alignment of crystallites in a semi-crystalline polyolefin can result in final products exhibiting unbalanced tear strengths.

It would be desirable to have an additive for ethylene polymers that would enhance their impact toughness. It would also be desirable to have an additive that provides enhanced impact toughness without substantially diminishing mechanical modulus and shear viscosity.

SUMMARY

According to the present disclosure, there is provided a multi-arm (greater than 3 arms) star ethylene polymer (sEP). The star ethylene polymer is a polymer of an ethylene/maleic anhydride copolymer (EMAC) grafted with vinyl-terminated polyethylene.

Further according to the present disclosure, there is provided a process for making a multi-arm star ethylene polymer. The process has the step of grafting greater than three arms of a vinyl-terminated polyethylene to an ethylene/maleic anhydride copolymer in solid state in the presence of a radical source.

Further according to the present disclosure, there is also provided a blend of a matrix ethylene polymer and 0.1 wt % to 10 wt % of the multi-arm star ethylene polymer described above based on the total weight of the blend.

DETAILED DESCRIPTION

Figure 1:
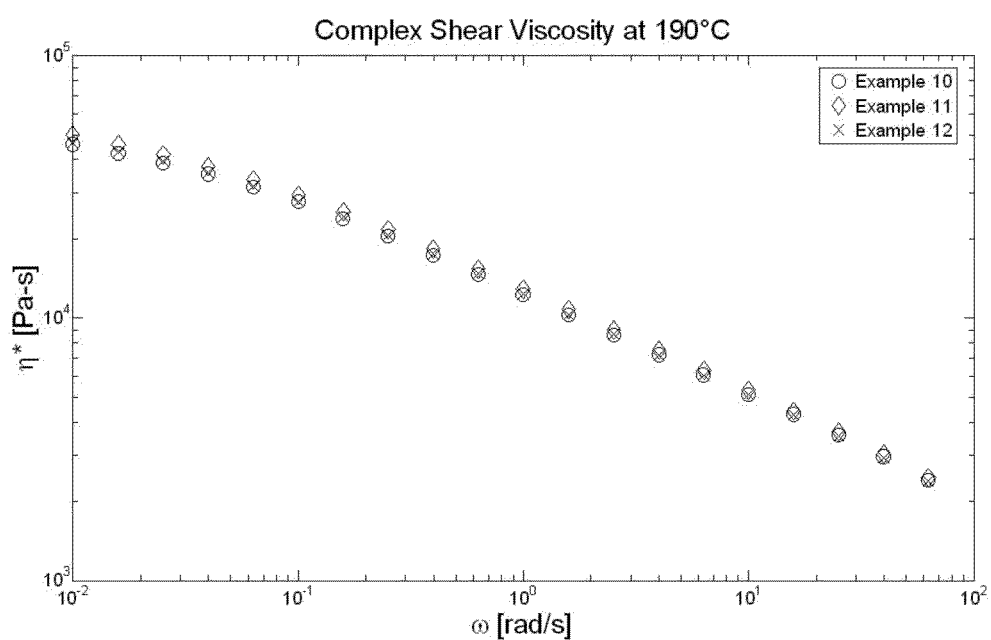
FIG. 1 is plot of shear viscosity values for Examples 10 to 12.
Figure 2:
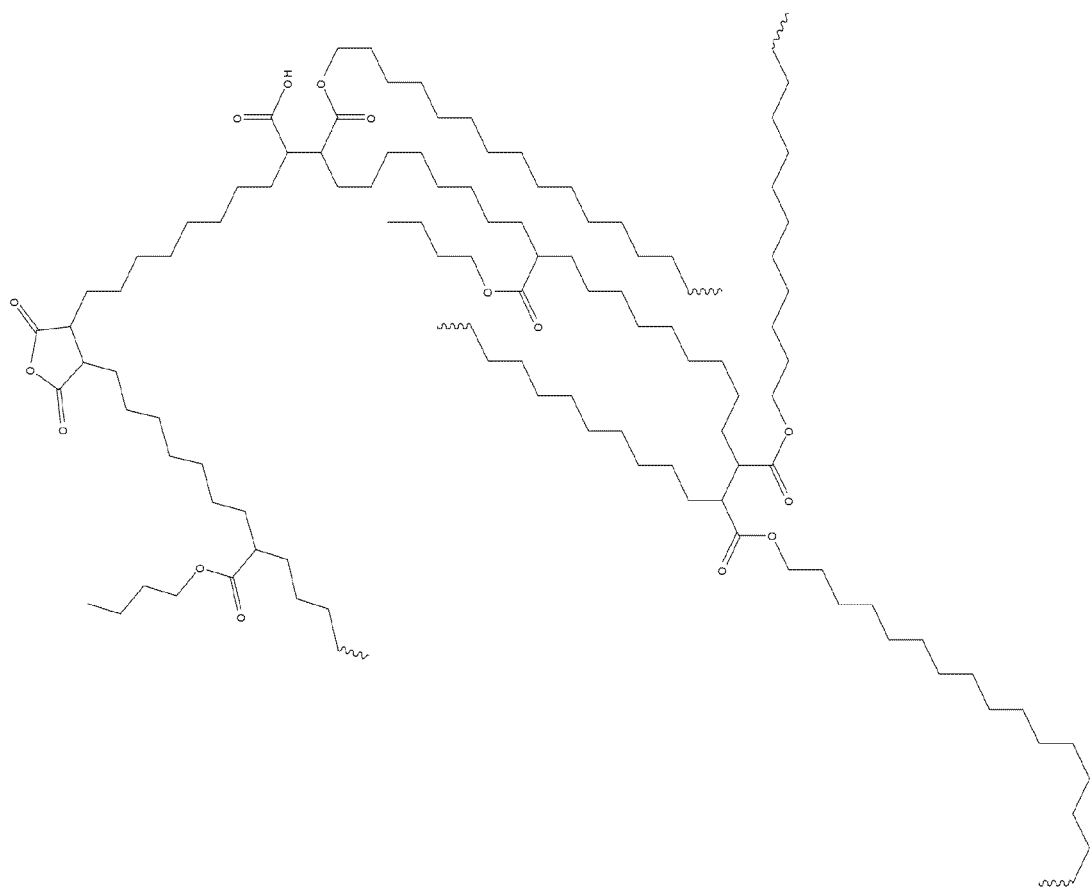
FIG. 2 is a structural formula corresponding to an embodiment of the multi-arm star ethylene polymer of the present disclosure.
Figure 3:
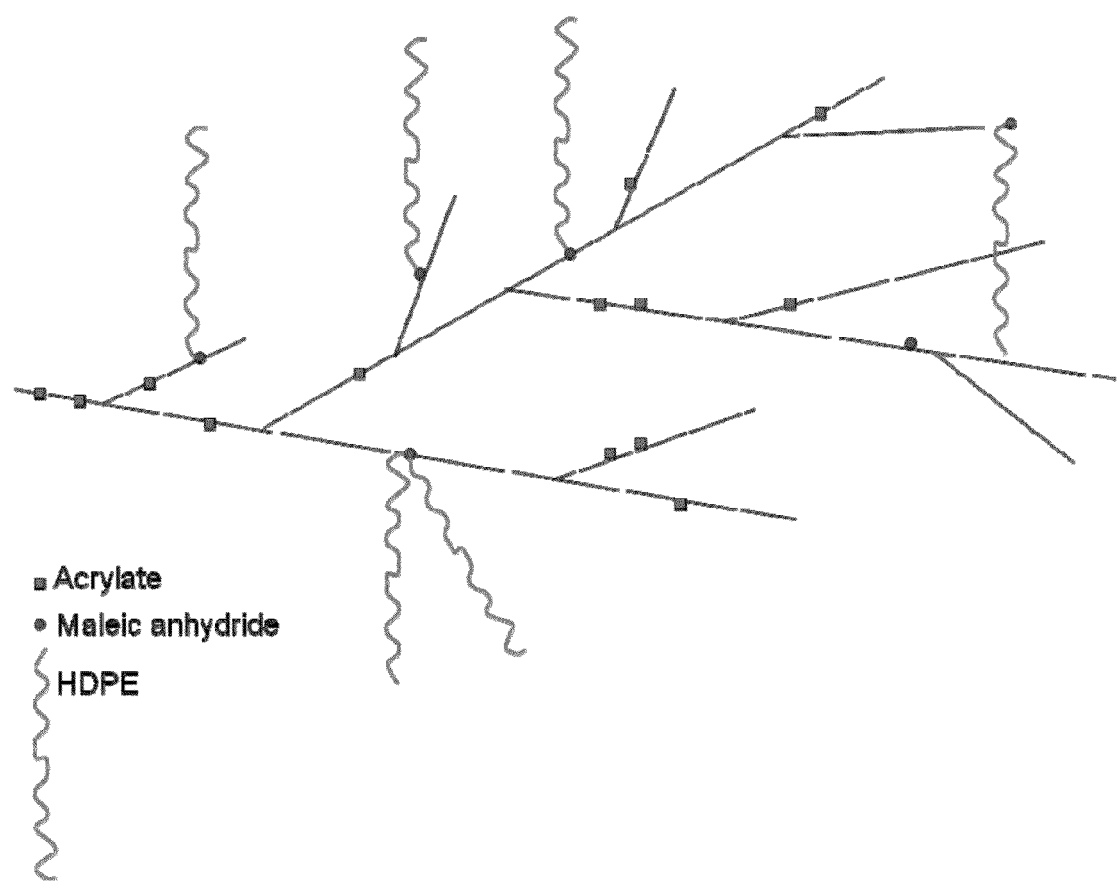
FIG. 3 is a schematic formula corresponding to an embodiment of the multi-arm star ethylene polymer of the present disclosure.

All numerical values within the detailed description and the claims herein are modified by "about" or "approximately" the indicated value, and take into account experimental error and variations that would be expected by a person having ordinary skill in the art.

Multi-arm (three or more) star ethylene polymers (sEPs) are produced by solid-state synthesis by grafting vinyl-terminated polyethylene (vPE) to ethylene/maleic anhydride copolymers (EMAC) in the presence of a radical source, such as a peroxide. Ethylene copolymers provide compatibility with vPE so that an intimate mixing can be obtained in order to provide homogenous solid-state grafting reaction. Maleic anhydride can be grafted onto ethylene copolymers or can be co-polymerized with ethylene to form the EMAC. The ethylene monomeric content of the EMAC should preferably be 80 wt % to 99.75 wt %, more preferably be 85 wt % to 98.5 wt %, and most preferably be 90 wt % to 98 wt % based on the total weight of the EMAC. The maleic anhydride content should preferably be 0.25 to 20 wt %, more preferably 0.5 to 15 wt %, and most preferably be 1.0 to 10 wt % of the EMAC based on the total weight of the EMAC. The weight average molecular weight (Mw) of the EMAC is typically from 5,000 to 900,000, more typically from 7,500 to 750,000, and most typically from 10,000 to 500,000 g/g·mol. A difunctional coupler, such as a hydroxyl thiol compound, e.g., HO—$(CH_2)_9$—SH, can also optionally be added to enhance the grafting of vPE. The hydroxyl group can react with the maleic anhydride in EMAC via esterification and the thiol group can react with the vinyl group in VPE by a thiolene reaction.

Other ethylene copolymers with functional groups that can react with the vinyl chain ends of vPE can also be employed, e.g. those with pendant —SH, —SiH, or —C=C groups, in place of or in addition to EMAC.

Useful vinyl-terminated polyethylenes preferably have greater than 80% vinyl chain ends, more preferably greater than 85% vinyl chain ends, and most preferably greater than 90% vinyl chain ends. The Mw of the vPE component is typically 1,000 to 500,000, more typically 2,000 to 450,000, and most typically 3,000 to 400,000. Preferably, the vPE is essentially linear with a branching index close to 1.0, e.g., greater than 0.7, more preferably greater than 0.8, and most preferably greater than 0.9. vPEs can be produced by various methods, including organo-metallic catalyzed coordination polymerization. Commercial HDPEs made with chrome catalysts that have >90% vinyl termination can also be utilized. Use of some fluorine catalysts yield vPEs having high proportions of vinyl chain ends with low polydispersity. Pyridylbisimido iron catalyst under certain reactor conditions also yields linear vPEs having high proportions of vinyl chain ends.

A ratio of VPE to EMAC of preferably greater than 3 by weight and most preferably equal to or greater than 5 by weight is employed to prevent gelation or crosslinking of the VPE. The peroxide or other radical source preferably has one-hour half-life temperature of greater than 70° C. Both alkyl and aromatic peroxides can be used with dicumyl peroxide being most preferred. The amount of peroxide employed is that sufficient to effect reaction and is preferably from 0.001 wt % to 1 wt %, more preferably from 0.003 wt % to 0.5 wt %, and most preferably from 0.005 wt % to 0.3 wt %. The resulting multi-arm sEP preferably has a gel content of less than 30 wt %, more preferably less than 20 wt %, and most preferably less than 10 wt %. Either a batch internal mixer or a continuous twin-screw extruder can be used for the solid state reaction. The reactive extrusion mixing temperature is preferably 150° C. to 220° C. and most preferably 160° C. to 200° C. The total mixing time (or the residence time for a continuous mixer) is preferably 1 to 9 minutes and most preferably 1.5 to 6 minutes. If desired, a coupler may be employed to enhance the reaction between VPE and EMAC. The total mixing time (or the residence time for a continuous mixer) is preferably 1 to 9 minutes and most preferably 1.5 to 6 minutes. Following blending, the blend melt is extruded, cooled, and pelletized to deliver a final product.

Useful peroxides include diacyl peroxides, peroxydicarbonates, peroxyesters, peroxyketals, dialkyl peroxides, T-amyl peroxides, and combinations thereof. Examples of useful peroxides include dicumyl peroxide and di-tert-butyl peroxide.

The star ethylene polymer/matrix ethylene polymer blend preferably has up to 10 wt %, more preferably up to 5 wt %, and most preferably 0.1 wt % to 5 wt % of the star ethylene polymer based on the total weight of the blend. The amount of star ethylene polymer employed is preferably sufficient to increase the impact toughness compared to the matrix ethylene polymer alone. The amount employed is preferably such that mechanical modulus and shear viscosity of the blend are not substantially diminished or compromised (≤5%) compared to the matrix ethylene polymer alone. In a particular embodiment, the star ethylene polymer is blended with LLDPE at 10 wt % or lower or most preferably at 7.5 wt % or lower, can raise the impact toughness of the LLDPE at −50° C. by greater than 50% and most preferably by greater than 100%. Further in that particular embodiment, the zero-shear-rate viscosity and mechanical modulus of the LLDPE are not diminished by more than 5% by the addition of 7.5 wt % or less of the star ethylene polymer. Impact (notched Izod) toughness is measured according to ASTM D256. Zero-shear-rate viscosity is measured according to the standard procedures described in "Rheology, Principles, Measurements, and Applications", C. W. Macosko, VCH Publishers, Inc., 1994. Mechanical modulus is measured according to ASTM D638.

The matrix ethylene polymer is preferably selected from the group consisting of low density polyethylene (LDPE), high density polyethylene (HDPE), linear low density polyethylene (LLDPE), metallocene catalyst polymerized LLDPE (mLLDPE), and very low density polyethylene (VLDPE), although other ethylene polymers are useful as well. Blends of the star ethylene polymer and LLDPE or mLLDPE are particularly useful.

Blends of sEP and matrix ethylene polymers are useful in forming fabricated articles. The articles can be formed according to any conventional technique, such as molding, stamping, extruding, and the like. An example of a technique is rotational molding of sEP/HDPE blends. Examples of useful fabricated article forms include blocks, planks, sheets, pipes, rods, films, and foams.

The following are examples of the present disclosure and are not to be construed as limiting.

EXAMPLES

Examples 1 to 9

Multi-arm star ethylene polymers of the present disclosure are formed by reacting vinyl-terminated polyethylene (vPE) with an ethylene/maleic acid copolymer.

The vPE used is the Paxon AL-55003 HDPE (ExxonMobil Chemical) with >95% vinyl termination with a weight average molecular weight of 118K and a g' value of 1 (perfectly linear). The vPE has a density of 0.95 and a MI (melt index) of 0.30. The EMAC is Lotader 3210 (Arkema), which is a terpolymer of ethylene, butyl acrylate, and maleic anhydride with 6% butyl acrylate and 3% maleic anhydride. The EMAC has a density of 0.94 and a MI of 5, a weight average molecular weight of 144,000, and a g' value of 0.55 (highly branched). EMAC was made in a high pressure reactor leading to a highly branched ethylene copolymer with tree-like long chain branches.

The vPE, the EMAC, and dicumyl peroxide were mixed and reacted in a DSM miniature twin-screw extruder running at 50 RPM, 180° C., for 3 minutes. Their relative weight percents are listed in Table 1 for Examples 1 to 9 with the final weight of each reactive blend ranging from 3 to 4 gm. Afterward, all polymers were first dissolved in a GPC solvent, trichlorobenzene (TCB), at 160° C. for 2 hours with agitation in preparation for the GPC-3D runs. The amount of the material that could not be dissolved after 2 hours was counted as the gel fraction. GPC-3D was then applied to determine the molecular weight and the branching extent of each example that could be dissolved. The branching index g' is determined by first calibrating light scattering, viscosity, and concentration detectors with homopolymer polyethylene (or an equivalent reference). The light scattering and viscometer detector offsets are determined relative to the concentration detector as described in the calibration. A linear homopolymer polyethylene is used to establish a Mark-Houwink (MH) linear reference line by injecting a broad molecular weight polyethylene reference, calculating the data file, and recording the intrinsic viscosity (IV) and molecular weight ($M_w$), each derived from the light scattering and viscosity detectors respectively and the concentration as determined from the RI detector mass constant for each chromatographic slice. The branching index (g') was found to be without any branching in Example 5, which is the direct blend of vPE and EMAC without peroxide addition. Although EMAC is branched, the amount of its use is too small for the GPC to detect the presence of branches in Example 5.

TABLE 1

(Examples 1-9)

| Example | vPE | EMAC | Peroxide | Mw | g' | Gel content |
|---|---|---|---|---|---|---|
| 1 | 82.5% | 16.5% | 1% | 65,000 | 0.78 | 0.71 |
| 2 | 82.9% | 16.6% | 0.5% | 106,000 | 0.77 | 0.51 |
| 3 | 90.5% | 9.0% | 0.5% | 125,000 | 0.70 | 0.59 |
| 4 | 94.9% | 4.6% | 0.5% | 108,000 | 0.77 | 0.65 |
| 5 | 91.0% | 9.0% | 0% | 93,000 | 1 | 0.17 |
| 6 | 90.7% | 9.0% | 0.3% | 134,000 | 0.77 | 0.53 |

TABLE 1-continued (Examples 1-9)

| Example | vPE | EMAC | Peroxide | Mw | g' | Gel content |
|---|---|---|---|---|---|---|
| 7 | 90.8% | 9.0% | 0.2% | 126,000 | 0.78 | 0.22 |
| 8 | 90.9% | 8.98% | 0.12% | 128,000 | 0.80 | 0.02 |
| 9 | 99.89% | 0 | 0.11% | 137,000 | 0.78 | 0.09 |

Fourier Transfer Infrared spectroscopy (FTIR) was also applied to examine the reactions between vPE and EMAC in Examples 1 to 4. The vinyl content in vPE was lowered down to almost zero in Examples 1 to 4 after the blending, whereas the maleic anhydride vibrational peak in EMAC was significantly reduced. This suggested that the expected peroxide-initiated radical grafting between the vinyl chain end of vPE and maleic anhydride moiety in EMAC did occur. Because of this grafting reaction, the branching index values of Examples 1 to 4 and 6 to 8 fell below 0.85. A theoretical 0.85 g' value is expected for a three-arm star whereas a 0.84 g' is predicted for a four-arm star. A further lowering of the g' value would be obtained for stars with more than 4 arms.

Peroxides can lead to the gelation of vPE if their amount is not controlled. As shown for Example 9, a highly branched vPE (not of the star branch type) could be obtained even with 0.1% of peroxide without the presence of EMAC. This material has 9% gel. As shown in Example 8, by using a similar amount of 0.1% peroxide in the presence of EMAC, the peroxide can be directed to the grafting reaction without crosslinking vPE and leading to a star-branch PE of 0.8 g' with a gel content of less than 5%. Example 8 was then blended into Enable 2705 (ExxonMobil Chemical) at 1 and 5 wt % using a DSM miniature twin-screw extruder at 180° C. for 3 minutes. A 0.1 wt % BHT antioxidant package was added to all blends. As shown in Table 2, Example 10 is Enable 2705 with 0.1% stabilizer that went through the mixing extruder at the same temperature and time as the blends of Examples 11 and 12. Examples 10-12 were then injection molded into tensile bars for both room-temperature tensile testing using an Instron tester and cold temperature Izod impact testing using an instrumented pendulum impact tester at −50° C.

TABLE 2

(Blending with Enable 2705)

| Example | Enable 2705 | Example 8 | BHT | Modulus (MPa) | Toughness (KJ/m2) |
|---|---|---|---|---|---|
| 10 | 99.9% | 0 | 0.1% | 171 | 15 |
| 11 | 98.9% | 1% | 0.1% | 167 | 14 |
| 12 | 94.9% | 5% | 0.1% | 168 | 40 |

As shown in Table 2, the addition of Example 8 star PE to Enable 2705 at 5% or less did not substantially affect the modulus and raised the blend toughness by more than 200%. At the same time, the addition of the star PE in Enable 2705 did not significantly modify the shear viscosity of Enable 2705 as indicated in FIG. 1. Additionally, no extensional hardening was detected at a strain rate of $1\ s^{-1}$ at 150° C. in Examples 10-12 during the measurement of extensional rheology using a Sentmanat Extensional Rheometer fixture in conjunction with an ARES rheometer from TA Instruments. The addition of dense comb, highly branched, or dendritic PE to Enable 2705 has been shown to deliver a strain hardening response. The lack of extensional hardening strongly suggests that the branch type in Example 8 is of the star type.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A multi-arm star ethylene polymer, comprising an ethylene/maleic anhydride copolymer grafted with vinyl-terminated polyethylene, wherein the multi-arm star ethylene polymer includes three or more arms, and
wherein the maleic anhydride is in the backbone of the multi-arm star ethylene polymer.

2. The polymer of claim 1, wherein the ethylene/maleic anhydride copolymer includes an ethylene monomeric content of 80 wt % to 99 wt % and a maleic anhydride monomeric content of 0.25 to 20 wt % based on the total weight of the ethylene/maleic anhydride copolymer.

3. The polymer of claim 2, wherein the ethylene monomeric content is 85 wt % to 98.5 wt % based on the total weight of the ethylene/maleic anhydride copolymer.

4. The polymer of claim 3, wherein the ethylene monomeric content is 90 wt % to 98 wt % based on the total weight of the ethylene/maleic anhydride copolymer.

5. The polymer of claim 2, wherein the maleic anhydride monomeric content is 0.5 wt % to 15 wt % based on the total weight of the ethylene/maleic anhydride copolymer.

6. The polymer of claim 5, wherein the maleic anhydride monomeric content is 1 wt % to 10 wt % based on the total weight of the ethylene/maleic anhydride copolymer.

7. A process for making a multi-arm star ethylene polymer, comprising: grafting vinyl-terminated polyethylene to an ethylene/maleic anhydride copolymer in solid state to form greater than three arms in the presence of a radical source.

8. The process of claim 7, wherein the radical source is a peroxide.

9. The process of claim 8, wherein the peroxide is selected from the alkyl or aromatic peroxides that have 1-hour half life temperature greater than 70° C.

10. The process of claim 9, wherein the peroxide is dicumyl peroxide.

11. The process of claim 7, further comprising grafting in the presence of a hydroxyl thiol difunctional coupler, e.g., $HO-(CH_2)_9-SH$.

12. The process of claim 7, wherein the ethylene/maleic anhydride copolymer includes an ethylene monomeric content of 80 wt % to 98 wt % and a maleic anhydride monomeric content of 0.25 wt % to 20 wt %.

13. A polymer blend comprising a matrix ethylene polymer and 0.1 wt % to 10 wt % of a multi-arm star ethylene polymer based on the total weight of the blend, wherein the multi-arm star ethylene polymer includes ethylene/maleic anhydride copolymer grafted with vinyl-terminated polyethylene, wherein the multi-arm star ethylene polymer includes three or more arms, and wherein the maleic anhydride is in the backbone of the multi-arm star ethylene polymer.

14. The polymer blend of claim 13, wherein the multi-arm star ethylene polymer is present at 0.1 wt % to 5 wt % based on the total weight of the blend.

15. The polymer blend of claim 13, wherein the matrix ethylene polymer is selected from the group consisting of LDPE, HDPE, LLDPE, and metallocene catalyst polymerized LLDPE.

16. The polymer blend of claim 15, wherein the matrix ethylene polymer is selected from the group consisting of LLDPE and metallocene catalyst polymerized LLDPE.

17. The polymer blend of claim 13, wherein the ethylene/maleic anhydride copolymer includes an ethylene monomeric content of 80 wt % to 99 wt % and a maleic anhydride monomeric content of 0.25 to 20 wt % based on the total weight of the ethylene/maleic anhydride copolymer.

18. The polymer blend of claim 17, wherein the ethylene monomeric content is 85 wt % to 98.5 wt % based on the total weight of the ethylene/maleic anhydride copolymer.

19. The polymer blend of claim 18, wherein the ethylene monomeric content is 90 wt % to 98 wt % based on the total weight of the ethylene/maleic anhydride copolymer.

20. The polymer blend of claim 17, wherein the maleic anhydride monomeric content is 0.5 wt % to 15 wt % based on the total weight of the ethylene/maleic anhydride copolymer.

21. The polymer blend of claim 20, wherein the maleic anhydride monomeric content is 1 wt % to 10 wt % based on the total weight of the ethylene/maleic anhydride copolymer.

22. The polymer of claim 1, wherein the ethylene/maleic anhydride copolymer further includes acrylate.

23. The polymer blend of claim 13, wherein the ethylene/maleic anhydride copolymer further includes acrylate.

* * * * *